(12) United States Patent
Cooper

(10) Patent No.: US 9,903,383 B2
(45) Date of Patent: Feb. 27, 2018

(54) MOLTEN METAL ROTOR WITH HARDENED TOP

(71) Applicant: Paul V. Cooper, Chesterland, OH (US)

(72) Inventor: Paul V. Cooper, Chesterland, OH (US)

(73) Assignee: Molten Metal Equipment Innovations, LLC, Middlefield, OH (US)

( * ) Notice: Subject to any disclaimer, the term of this patent is extended or adjusted under 35 U.S.C. 154(b) by 877 days.

(21) Appl. No.: 13/800,460

(22) Filed: Mar. 13, 2013

(65) Prior Publication Data

US 2014/0271219 A1    Sep. 18, 2014

(51) Int. Cl.
*F04D 29/22* (2006.01)
*B22D 39/00* (2006.01)
(Continued)

(52) U.S. Cl.
CPC ......... *F04D 29/2261* (2013.01); *B22D 17/30* (2013.01); *B22D 39/00* (2013.01); *C22B 7/003* (2013.01); *C22B 21/0092* (2013.01); *F04D 7/00* (2013.01); *F04D 7/06* (2013.01); *F04D 7/065* (2013.01); *F04D 17/08* (2013.01); *F04D 29/026* (2013.01); *F04D 29/2216* (2013.01); *F04D 29/2222* (2013.01); *F04D 29/2227* (2013.01); *F04D 29/242* (2013.01); *F27D 3/14* (2013.01); *F27D 27/005* (2013.01); *F05D 2240/303* (2013.01); *F05D 2300/226* (2013.01); *F27D 2003/0054* (2013.01); *Y02W 30/54* (2015.05); *Y10S 266/901* (2013.01)

(58) Field of Classification Search
CPC .......... F04D 7/065; F04D 7/00; F04D 29/026; F04D 29/2216; F04D 29/2227; F04D 29/2222; F04D 29/242; F04D 17/08; Y02W 30/54; F27D 3/14; F27D 27/005; F27D 27/00; F27D 2003/0054; B22D 17/30; B22D 39/00; C22B 21/0092; C22B 7/003; Y10S 266/901; F05D 2240/303; F05D 2300/226
USPC ...................................... 416/241 B
See application file for complete search history.

(56) References Cited

U.S. PATENT DOCUMENTS 35,604 A  6/1862  Guild
116,797 A  7/1871  Barnhart
(Continued)

FOREIGN PATENT DOCUMENTS

CA  683469  3/1964
CA  2115929  8/1992
(Continued)

OTHER PUBLICATIONS

US 5,961,265, 10/1999, Meneice et al. (withdrawn)
(Continued)

*Primary Examiner* — Mark Laurenzi
*Assistant Examiner* — Wesley Harris
(74) *Attorney, Agent, or Firm* — Sneel & Wilmer L.L.P.

(57) ABSTRACT

Embodiments of the invention are directed to a rotor for a molten metal pump and a molten metal pump including the rotor. The rotor has a main body and a top comprised of a material that is at least twice as hard as the main body. The top, among other things, may form a first portion of each rotor blade wherein the first portion directs molten metal into a pump chamber or other structure in which the rotor is mounted.

38 Claims, 2 Drawing Sheets

(51) Int. Cl.
| | |
|---|---|
| *F04D 29/02* | (2006.01) |
| *C22B 21/00* | (2006.01) |
| *F27D 3/14* | (2006.01) |
| *C22B 7/00* | (2006.01) |
| *F04D 29/24* | (2006.01) |
| *F27D 27/00* | (2010.01) |
| *F04D 7/00* | (2006.01) |
| *F04D 17/08* | (2006.01) |
| *F04D 7/06* | (2006.01) |
| *B22D 17/30* | (2006.01) |
| *F27D 3/00* | (2006.01) |

(56) References Cited

U.S. PATENT DOCUMENTS

| | | |
|---|---|---|
| 209,219 A | 10/1878 | Bookwalter |
| 251,104 A | 12/1881 | Finch |
| 307,845 A | 11/1884 | Curtis |
| 364,804 A | 6/1887 | Cole |
| 390,319 A | 10/1888 | Thomson |
| 495,760 A | 4/1893 | Seitz |
| 506,572 A | 10/1893 | Wagener |
| 585,188 A | 6/1897 | Davis |
| 757,932 A | 4/1904 | Jones |
| 882,477 A | 3/1908 | Neumann |
| 882,478 A | 3/1908 | Neumann |
| 890,319 A | 6/1908 | Wells |
| 898,499 A | 9/1908 | O'Donnell |
| 909,774 A | 1/1909 | Flora |
| 919,194 A | 4/1909 | Livingston |
| 1,037,659 A | 9/1912 | Rembert |
| 1,100,475 A | 6/1914 | Franckaerts |
| 1,170,512 A | 2/1916 | Chapman |
| 1,185,314 A | 5/1916 | Hedgcock |
| 1,196,758 A | 9/1916 | Blair |
| 1,304,068 A | 5/1919 | Krogh |
| 1,331,997 A | 2/1920 | Neal |
| 1,377,101 A | 5/1921 | Sparling |
| 1,380,798 A | 6/1921 | Hansen et al. |
| 1,439,365 A | 12/1922 | Hazell |
| 1,454,967 A | 5/1923 | Gill |
| 1,470,607 A | 10/1923 | Hazell |
| 1,513,875 A | 11/1924 | Wilke |
| 1,518,501 A | 12/1924 | Gill |
| 1,522,765 A | 1/1925 | Wilke |
| 1,526,851 A | 2/1925 | Hall |
| 1,669,668 A | 5/1928 | Marshall |
| 1,673,594 A | 6/1928 | Schmidt |
| 1,697,202 A | 1/1929 | Nagle |
| 1,717,969 A | 6/1929 | Goodner |
| 1,718,396 A | 6/1929 | Wheeler |
| 1,896,201 A | 2/1933 | Sterner-Rainer |
| 1,988,875 A | 1/1935 | Saborio |
| 2,013,455 A | 9/1935 | Baxter |
| 2,038,221 A | 4/1936 | Kagi |
| 2,075,633 A | 3/1937 | Anderegg |
| 2,090,162 A | 8/1937 | Tighe |
| 2,091,677 A | 8/1937 | Fredericks |
| 2,138,814 A | 12/1938 | Bressler |
| 2,173,377 A | 9/1939 | Schultz, Jr. et al. |
| 2,264,740 A | 12/1941 | Brown |
| 2,280,979 A | 4/1942 | Rocke |
| 2,290,961 A | 7/1942 | Heuer |
| 2,300,688 A | 11/1942 | Nagle |
| 2,304,849 A | 12/1942 | Ruthman |
| 2,368,962 A | 2/1945 | Blom |
| 2,383,424 A | 8/1945 | Stepanoff |
| 2,423,655 A | 7/1947 | Mars et al. |
| 2,488,447 A | 11/1949 | Tangen et al. |
| 2,493,467 A | 1/1950 | Sunnen |
| 2,515,097 A | 7/1950 | Schryber |
| 2,515,478 A | 7/1950 | Tooley et al. |
| 2,528,208 A | 10/1950 | Bonsack et al. |
| 2,528,210 A | 10/1950 | Stewart |
| 2,543,633 A | 2/1951 | Lamphere |
| 2,566,892 A | 9/1951 | Jacobs |
| 2,625,720 A | 1/1953 | Ross |
| 2,626,086 A | 1/1953 | Forrest |
| 2,676,279 A | 4/1954 | Wilson |
| 2,677,609 A | 5/1954 | Moore et al. |
| 2,698,583 A | 1/1955 | House et al. |
| 2,714,354 A | 8/1955 | Farrand |
| 2,762,095 A | 9/1956 | Pemetzrieder |
| 2,768,587 A | 10/1956 | Corneil |
| 2,775,348 A | 12/1956 | Williams |
| 2,779,574 A | 1/1957 | Schneider |
| 2,787,873 A | 4/1957 | Hadley |
| 2,808,782 A | 10/1957 | Thompson et al. |
| 2,809,107 A | 10/1957 | Russell |
| 2,821,472 A | 1/1958 | Peterson et al. |
| 2,824,520 A | 2/1958 | Bartels |
| 2,832,292 A | 4/1958 | Edwards |
| 2,839,006 A | 6/1958 | Mayo |
| 2,853,019 A | 9/1958 | Thorton |
| 2,865,295 A | 12/1958 | Nikolaus |
| 2,865,618 A | 12/1958 | Abell |
| 2,868,132 A | 1/1959 | Rittershofer |
| 2,901,006 A | 8/1959 | Andrews |
| 2,901,677 A | 8/1959 | Chessman et al. |
| 2,906,632 A | 9/1959 | Nickerson |
| 2,918,876 A | 12/1959 | Howe |
| 2,948,524 A | 8/1960 | Sweeney et al. |
| 2,958,293 A | 11/1960 | Pray, Jr. |
| 2,978,885 A | 4/1961 | Davison |
| 2,984,524 A | 5/1961 | Franzen |
| 2,987,885 A | 6/1961 | Hodge |
| 3,010,402 A | 11/1961 | King |
| 3,015,190 A | 1/1962 | Arbeit |
| 3,039,864 A | 6/1962 | Hess |
| 3,044,408 A | 7/1962 | Mellott |
| 3,048,384 A | 8/1962 | Sweeney et al. |
| 3,070,393 A | 12/1962 | Silverberg et al. |
| 3,092,030 A | 6/1963 | Wunder |
| 3,099,870 A | 8/1963 | Seeler |
| 3,128,327 A | 4/1964 | Upton |
| 3,130,678 A | 4/1964 | Chenault |
| 3,130,679 A | 4/1964 | Sence |
| 3,171,357 A | 3/1965 | Egger |
| 3,203,182 A | 8/1965 | Pohl |
| 3,172,850 A | 9/1965 | Englesberg et al. |
| 3,227,547 A | 1/1966 | Szekely |
| 3,244,109 A | 4/1966 | Barske |
| 3,251,676 A | 5/1966 | Johnson |
| 3,255,702 A | 6/1966 | Gehrm |
| 3,258,283 A | 6/1966 | Winberg et al. |
| 3,272,619 A | 9/1966 | Sweeney et al. |
| 3,289,473 A | 12/1966 | Louda |
| 3,291,473 A | 12/1966 | Sweeney et al. |
| 3,368,805 A | 2/1968 | Davey et al. |
| 3,374,943 A | 3/1968 | Cervenka |
| 3,400,923 A | 9/1968 | Howie et al. |
| 3,417,929 A | 12/1968 | Secrest et al. |
| 3,432,336 A | 3/1969 | Langrod |
| 3,459,133 A | 8/1969 | Scheffler |
| 3,459,346 A | 8/1969 | Tinnes |
| 3,477,383 A | 11/1969 | Rawson et al. |
| 3,487,805 A | 1/1970 | Satterthwaite |
| 3,512,762 A | 5/1970 | Umbricht |
| 3,512,788 A | 5/1970 | Kilbane |
| 3,532,445 A | 10/1970 | Scheffler et al. |
| 3,561,885 A | 2/1971 | Lake |
| 3,575,525 A | 4/1971 | Fox et al. |
| 3,581,767 A | 6/1971 | Jackson |
| 3,612,715 A | 10/1971 | Yedidiah |
| 3,618,917 A | 11/1971 | Fredrikson |
| 3,620,716 A | 11/1971 | Hess |
| 3,650,730 A | 3/1972 | Derham et al. |
| 3,689,048 A | 9/1972 | Foulard et al. |
| 3,715,112 A | 2/1973 | Carbonnel |
| 3,732,032 A | 5/1973 | Daneel |
| 3,737,304 A | 6/1973 | Blayden |
| 3,737,305 A | 6/1973 | Blayden et al. |
| 3,743,263 A | 7/1973 | Szekely |

(56) References Cited

U.S. PATENT DOCUMENTS

| | | |
|---|---|---|
| 3,743,500 A | 7/1973 | Foulard et al. |
| 3,753,690 A | 8/1973 | Emley et al. |
| 3,759,628 A | 9/1973 | Kempf |
| 3,759,635 A | 9/1973 | Carter et al. |
| 3,767,382 A | 10/1973 | Bruno et al. |
| 3,776,660 A | 12/1973 | Anderson et al. |
| 3,785,632 A | 1/1974 | Kraemer et al. |
| 3,787,143 A | 1/1974 | Carbonnel et al. |
| 3,799,522 A | 3/1974 | Brant et al. |
| 3,799,523 A | 3/1974 | Seki |
| 3,807,708 A | 4/1974 | Jones |
| 3,814,400 A | 6/1974 | Seki |
| 3,824,028 A | 7/1974 | Zenkner et al. |
| 3,824,042 A | 7/1974 | Barnes et al. |
| 3,836,280 A | 9/1974 | Koch |
| 3,839,019 A | 10/1974 | Bruno et al. |
| 3,844,972 A | 10/1974 | Tully, Jr. et al. |
| 3,871,872 A | 3/1975 | Downing et al. |
| 3,873,073 A | 3/1975 | Baum et al. |
| 3,873,305 A | 3/1975 | Claxton et al. |
| 3,881,039 A | 4/1975 | Baldieri et al. |
| 3,886,992 A | 6/1975 | Maas et al. |
| 3,915,594 A | 10/1975 | Nesseth |
| 3,915,694 A | 10/1975 | Ando |
| 3,935,003 A | 1/1976 | Steinke et al. |
| 3,941,588 A | 3/1976 | Dremann |
| 3,941,589 A | 3/1976 | Norman et al. |
| 3,942,473 A | 3/1976 | Chodash |
| 3,954,134 A | 5/1976 | Maas et al. |
| 3,958,979 A | 5/1976 | Valdo |
| 3,958,981 A | 5/1976 | Forberg et al. |
| 3,961,778 A | 6/1976 | Carbonnel et al. |
| 3,966,456 A | 6/1976 | Ellenbaum et al. |
| 3,976,286 A | 6/1976 | Andersson et al. |
| 3,972,709 A | 8/1976 | Chin et al. |
| 3,973,871 A | 8/1976 | Hance |
| 3,984,234 A | 10/1976 | Claxton et al. |
| 3,985,000 A | 10/1976 | Hartz |
| 3,997,336 A | 12/1976 | Van Linden et al. |
| 4,003,560 A | 1/1977 | Carbonnel |
| 4,008,884 A | 2/1977 | Fitzpatrick et al. |
| 4,018,598 A | 4/1977 | Markus |
| 4,043,146 A | 8/1977 | Stegherr |
| 4,052,199 A | 10/1977 | Mangalick |
| 4,055,390 A | 10/1977 | Young |
| 4,063,849 A | 12/1977 | Modianos |
| 4,068,965 A | 1/1978 | Lichti |
| 4,073,606 A | 2/1978 | Eller |
| 4,091,970 A | 5/1978 | Kimiyama et al. |
| 4,119,141 A | 10/1978 | Thut et al. |
| 4,125,146 A | 11/1978 | Muller |
| 4,126,360 A | 11/1978 | Miller et al. |
| 4,128,415 A | 12/1978 | Van Linden et al. |
| 4,169,584 A | 10/1979 | Mangalick |
| 4,191,486 A | 3/1980 | Pelton |
| 4,213,742 A | 7/1980 | Henshaw |
| 4,242,039 A | 12/1980 | Villard et al. |
| 4,244,423 A | 1/1981 | Thut et al. |
| 4,286,985 A | 9/1981 | Van Linden et al. |
| 4,305,214 A | 12/1981 | Hurst |
| 4,322,245 A | 3/1982 | Claxton |
| 4,338,062 A | 7/1982 | Neal |
| 4,347,041 A | 8/1982 | Cooper |
| 4,351,514 A | 9/1982 | Koch |
| 4,355,789 A | 10/1982 | Dolzhenkov et al. |
| 4,356,940 A | 11/1982 | Ansorge |
| 4,360,314 A | 11/1982 | Pennell |
| 4,370,096 A | 1/1983 | Church |
| 4,372,541 A | 2/1983 | Bocourt et al. |
| 4,375,937 A | 3/1983 | Cooper |
| 4,389,159 A | 6/1983 | Sarvanne |
| 4,392,888 A | 7/1983 | Eckert et al. |
| 4,410,299 A | 10/1983 | Shimoyama |
| 4,419,049 A | 12/1983 | Gerboth et al. |
| 4,456,424 A | 6/1984 | Araoka |
| 4,470,846 A | 9/1984 | Dube |
| 4,474,315 A | 10/1984 | Gilbert et al. |
| 4,496,393 A | 1/1985 | Lustenberger |
| 4,504,392 A | 3/1985 | Groteke |
| 4,509,979 A | 4/1985 | Bauer |
| 4,537,624 A | 8/1985 | Tenhover et al. |
| 4,537,625 A | 8/1985 | Tenhover et al. |
| 4,556,419 A | 12/1985 | Otsuka et al. |
| 4,557,766 A | 12/1985 | Tenhover et al. |
| 4,586,845 A | 5/1986 | Morris |
| 4,592,700 A | 6/1986 | Toguchi et al. |
| 4,594,052 A | 6/1986 | Niskanen |
| 4,596,510 A | 6/1986 | Arneth et al. |
| 4,598,899 A | 7/1986 | Cooper |
| 4,600,222 A | 7/1986 | Appling |
| 4,607,825 A | 8/1986 | Briolle et al. |
| 4,609,442 A | 9/1986 | Tenhover et al. |
| 4,611,790 A | 9/1986 | Otsuka et al. |
| 4,617,232 A | 10/1986 | Chandler et al. |
| 4,634,105 A | 1/1987 | Withers et al. |
| 4,640,666 A | 2/1987 | Sodergard |
| 4,655,610 A | 4/1987 | Al-Jaroudi |
| 4,673,434 A | 6/1987 | Withers et al. |
| 4,684,281 A | 8/1987 | Patterson |
| 4,685,822 A | 8/1987 | Pelton |
| 4,696,703 A | 9/1987 | Henderson et al. |
| 4,701,226 A | 10/1987 | Henderson et al. |
| 4,702,768 A | 10/1987 | Areauz et al. |
| 4,714,371 A | 12/1987 | Cuse |
| 4,717,540 A | 1/1988 | McRae et al. |
| 4,739,974 A | 4/1988 | Mordue |
| 4,743,428 A | 5/1988 | McRae et al. |
| 4,747,583 A | 5/1988 | Gordon et al. |
| 4,767,230 A | 8/1988 | Leas, Jr. |
| 4,770,701 A | 9/1988 | Henderson et al. |
| 4,786,230 A | 11/1988 | Thut |
| 4,802,656 A | 2/1989 | Hudault et al. |
| 4,804,168 A | 2/1989 | Otsuka et al. |
| 4,810,314 A | 3/1989 | Henderson et al. |
| 4,834,573 A | 5/1989 | Asano et al. |
| 4,842,227 A | 6/1989 | Harrington et al. |
| 4,844,425 A | 7/1989 | Piras et al. |
| 4,851,296 A | 7/1989 | Tenhover et al. |
| 4,859,413 A | 8/1989 | Harris et al. |
| 4,867,638 A | 9/1989 | Handtmann et al. |
| 4,884,786 A | 12/1989 | Gillespie |
| 4,898,367 A | 2/1990 | Cooper |
| 4,908,060 A | 3/1990 | Duenkelmann |
| 4,923,770 A | 5/1990 | Grasselli et al. |
| 4,930,986 A | 6/1990 | Cooper |
| 4,931,091 A | 6/1990 | Waite et al. |
| 4,940,214 A | 7/1990 | Gillespie |
| 4,940,384 A | 7/1990 | Amra et al. |
| 4,954,167 A | 9/1990 | Cooper |
| 4,973,433 A | 11/1990 | Gilbert et al. |
| 4,986,736 A | 1/1991 | Kajiwara |
| 5,015,518 A | 5/1991 | Sasaki et al. |
| 5,025,198 A | 6/1991 | Mordue et al. |
| 5,028,211 A | 7/1991 | Mordue et al. |
| 5,029,821 A | 7/1991 | Bar-On et al. |
| 5,058,654 A | 10/1991 | Simmons |
| 5,078,572 A | 1/1992 | Amra et al. |
| 5,080,715 A | 1/1992 | Provencher et al. |
| 5,083,753 A | 1/1992 | Soofie |
| 5,088,893 A | 2/1992 | Gilbert et al. |
| 5,092,821 A | 3/1992 | Gilbert et al. |
| 5,098,134 A | 3/1992 | Monckton |
| 5,114,312 A | 5/1992 | Stanislao |
| 5,126,047 A | 6/1992 | Martin et al. |
| 5,131,632 A | 7/1992 | Olson |
| 5,143,357 A | 9/1992 | Gilbert et al. |
| 5,145,322 A | 9/1992 | Senior, Jr. et al. |
| 5,152,631 A | 10/1992 | Bauer |
| 5,154,652 A | 10/1992 | Ecklesdafer |
| 5,158,440 A | 10/1992 | Cooper et al. |
| 5,162,858 A | 10/1992 | Shoji et al. |
| 5,165,858 A | 11/1992 | Gilbert et al. |
| 5,177,304 A | 1/1993 | Nagel |
| 5,191,154 A | 3/1993 | Nagel |

(56) References Cited

U.S. PATENT DOCUMENTS

| | | |
|---|---|---|
| 5,192,193 A | 3/1993 | Cooper et al. |
| 5,202,100 A | 4/1993 | Nagel et al. |
| 5,203,681 A | 4/1993 | Cooper |
| 5,209,641 A | 5/1993 | Hoglund et al. |
| 5,215,448 A | 6/1993 | Cooper |
| 5,268,020 A | 12/1993 | Claxton |
| 5,286,163 A | 2/1994 | Amra et al. |
| 5,298,233 A | 3/1994 | Nagel |
| 5,301,620 A | 4/1994 | Nagel et al. |
| 5,303,903 A | 4/1994 | Butler et al. |
| 5,308,045 A | 5/1994 | Cooper |
| 5,310,412 A | 5/1994 | Gilbert et al. |
| 5,318,360 A | 6/1994 | Langer et al. |
| 5,322,547 A | 6/1994 | Nagel et al. |
| 5,324,341 A | 6/1994 | Nagel et al. |
| 5,330,328 A | 7/1994 | Cooper |
| 5,354,940 A | 10/1994 | Nagel |
| 5,358,549 A | 10/1994 | Nagel et al. |
| 5,358,697 A | 10/1994 | Nagel |
| 5,364,078 A | 11/1994 | Pelton |
| 5,369,063 A | 11/1994 | Gee et al. |
| 5,388,633 A | 2/1995 | Mercer, II et al. |
| 5,395,405 A | 3/1995 | Nagel et al. |
| 5,399,074 A | 3/1995 | Nose et al. |
| 5,407,294 A | 4/1995 | Giannini |
| 5,411,240 A | 5/1995 | Rapp et al. |
| 5,425,410 A | 6/1995 | Reynolds |
| 5,431,551 A | 7/1995 | Aquino et al. |
| 5,435,982 A | 7/1995 | Wilkinson |
| 5,436,210 A | 7/1995 | Wilkinson et al. |
| 5,443,572 A | 8/1995 | Wilkinson et al. |
| 5,454,423 A | 10/1995 | Tsuchida et al. |
| 5,426,280 A | 11/1995 | Areaux |
| 5,468,280 A | 11/1995 | Areaux |
| 5,470,201 A | 11/1995 | Gilbert et al. |
| 5,484,265 A | 1/1996 | Horvath et al. |
| 5,489,734 A | 2/1996 | Nagel et al. |
| 5,491,279 A | 2/1996 | Robert et al. |
| 5,495,746 A | 3/1996 | Sigworth |
| 5,505,143 A | 4/1996 | Nagel |
| 5,505,435 A | 4/1996 | Laszlo |
| 5,509,791 A | 4/1996 | Turner |
| 5,511,766 A | 4/1996 | Vassillicos |
| 5,537,940 A | 7/1996 | Nagel et al. |
| 5,543,558 A | 8/1996 | Nagel et al. |
| 5,558,505 A | 8/1996 | Mordue et al. |
| 5,555,822 A | 9/1996 | Loewen et al. |
| 5,558,501 A | 9/1996 | Wang et al. |
| 5,571,486 A | 11/1996 | Robert et al. |
| 5,585,532 A | 12/1996 | Nagel |
| 5,586,863 A | 12/1996 | Gilbert et al. |
| 5,591,243 A | 1/1997 | Colussi et al. |
| 5,597,289 A | 1/1997 | Thut |
| 5,613,245 A | 3/1997 | Robert |
| 5,616,167 A | 4/1997 | Eckert |
| 5,622,481 A | 4/1997 | Thut |
| 5,629,464 A | 5/1997 | Bach et al. |
| 5,634,770 A | 6/1997 | Gilbert et al. |
| 5,640,706 A | 6/1997 | Nagel et al. |
| 5,640,707 A | 6/1997 | Nagel et al. |
| 5,640,709 A | 6/1997 | Nagel et al. |
| 5,655,849 A | 8/1997 | McEwen et al. |
| 5,660,614 A | 8/1997 | Waite et al. |
| 5,662,725 A | 9/1997 | Cooper |
| 5,676,520 A | 10/1997 | Thut |
| 5,678,244 A | 10/1997 | Shaw et al. |
| 5,678,807 A | 10/1997 | Cooper |
| 5,679,132 A | 10/1997 | Rauenzahn et al. |
| 5,685,701 A | 11/1997 | Chandler et al. |
| 5,690,888 A | 11/1997 | Robert |
| 5,695,732 A | 12/1997 | Sparks et al. |
| 5,716,195 A | 2/1998 | Thut |
| 5,717,149 A | 2/1998 | Nagel et al. |
| 5,718,416 A | 2/1998 | Flisakowski et al. |
| 5,735,668 A | 4/1998 | Klien |
| 5,735,935 A | 4/1998 | Areaux |
| 5,741,422 A | 4/1998 | Eichenmiller et al. |
| 5,744,117 A | 4/1998 | Wilikinson et al. |
| 5,745,861 A | 4/1998 | Bell et al. |
| 5,772,324 A | 6/1998 | Falk |
| 5,776,420 A | 7/1998 | Nagel |
| 5,785,494 A | 7/1998 | Vild et al. |
| 5,842,832 A | 12/1998 | Thut |
| 5,858,059 A | 1/1999 | Abramovich et al. |
| 5,863,314 A | 1/1999 | Morando |
| 5,866,095 A | 2/1999 | McGeever et al. |
| 5,875,385 A | 2/1999 | Stephenson et al. |
| 5,935,528 A | 8/1999 | Stephenson et al. |
| 5,944,496 A | 8/1999 | Cooper |
| 5,947,705 A | 9/1999 | Mordue et al. |
| 5,951,243 A | 9/1999 | Cooper |
| 5,961,285 A | 10/1999 | Meneice et al. |
| 5,963,580 A | 10/1999 | Eckert |
| 5,992,230 A | 11/1999 | Scarpa et al. |
| 5,993,726 A | 11/1999 | Huang |
| 5,993,728 A | 11/1999 | Vild |
| 6,019,576 A | 2/2000 | Thut |
| 6,027,685 A | 2/2000 | Cooper |
| 6,036,745 A | 3/2000 | Gilbert et al. |
| 6,074,455 A | 6/2000 | van Linden et al. |
| 6,082,965 A | 7/2000 | Morando |
| 6,093,000 A | 7/2000 | Cooper |
| 6,096,109 A | 8/2000 | Nagel et al. |
| 6,113,154 A | 9/2000 | Thut |
| 6,123,523 A | 9/2000 | Cooper |
| 6,152,691 A | 11/2000 | Thut |
| 6,168,753 B1 | 1/2001 | Morando |
| 6,187,096 B1 | 2/2001 | Thut |
| 6,199,836 B1 | 3/2001 | Rexford et al. |
| 6,217,823 B1 | 4/2001 | Vild et al. |
| 6,231,639 B1 | 5/2001 | Eichenmiller |
| 6,250,881 B1 | 6/2001 | Mordue et al. |
| 6,254,340 B1 | 7/2001 | Vild et al. |
| 6,270,717 B1 | 8/2001 | Tremblay et al. |
| 6,280,157 B1 | 8/2001 | Cooper |
| 6,293,759 B1 | 9/2001 | Thut |
| 6,303,074 B1 | 10/2001 | Cooper |
| 6,345,964 B1 | 2/2002 | Cooper |
| 6,354,796 B1 | 3/2002 | Morando |
| 6,364,930 B1 | 4/2002 | Koss |
| 6,371,723 B1 | 4/2002 | Grant et al. |
| 6,398,525 B1 | 6/2002 | Cooper |
| 6,439,860 B1 | 8/2002 | Greer |
| 6,451,247 B1 | 9/2002 | Mordue et al. |
| 6,358,467 B1 | 10/2002 | Mordue |
| 6,457,940 B1 | 10/2002 | Lehman |
| 6,457,950 B1 | 10/2002 | Cooper et al. |
| 6,464,458 B2 | 10/2002 | Vild et al. |
| 6,464,459 B2 | 10/2002 | Vild |
| 6,500,228 B1 | 10/2002 | Klingensmith et al. |
| 6,497,559 B1 | 12/2002 | Grant |
| 6,503,292 B2 | 1/2003 | Klingensmith et al. |
| 6,524,066 B2 | 2/2003 | Thut |
| 6,533,535 B2 | 3/2003 | Thut |
| 6,551,060 B2 | 4/2003 | Mordue et al. |
| 6,562,286 B1 | 5/2003 | Lehman |
| 6,656,415 B2 | 12/2003 | Kos |
| 6,679,936 B2 | 1/2004 | Quackenbush |
| 6,689,310 B1 | 2/2004 | Cooper |
| 6,709,234 B2 | 3/2004 | Gilbert et al. |
| 6,723,276 B1 | 4/2004 | Cooper |
| 6,805,834 B2 | 10/2004 | Thut |
| 6,843,640 B2 | 1/2005 | Mordue et al. |
| 6,848,497 B2 | 2/2005 | Sale et al. |
| 6,869,271 B2 | 3/2005 | Uchida et al. |
| 6,869,564 B2 | 3/2005 | Gilbert et al. |
| 6,881,030 B2 | 4/2005 | Thut |
| 6,887,424 B2 | 5/2005 | Ohno et al. |
| 6,887,425 B2 | 5/2005 | Mordue et al. |
| 6,902,696 B2 | 6/2005 | Klingensmith et al. |
| 7,037,462 B2 | 5/2006 | Klingensmith et al. |
| 7,074,361 B2 | 7/2006 | Carolla |
| 7,083,758 B2 | 8/2006 | Tremblay |
| 7,131,482 B2 | 11/2006 | Vincent et al. |

(56) References Cited

U.S. PATENT DOCUMENTS

| | | | |
|---|---|---|---|
| 7,157,043 B2 | 1/2007 | Neff | |
| 7,204,954 B2 | 4/2007 | Mizuno | |
| 7,279,128 B2 | 10/2007 | Kennedy et al. | |
| 7,326,028 B2 * | 2/2008 | Morando | F04D 7/065 415/102 |
| 7,402,276 B2 | 7/2008 | Cooper | |
| 7,470,392 B2 | 12/2008 | Cooper | |
| 7,476,357 B2 | 1/2009 | Thut | |
| 7,481,966 B2 | 1/2009 | Mizuno | |
| 7,497,988 B2 | 3/2009 | Thut | |
| 7,507,367 B2 | 3/2009 | Cooper | |
| 7,543,605 B1 | 6/2009 | Morando | |
| 7,731,891 B2 | 6/2010 | Cooper | |
| 7,906,068 B2 | 3/2011 | Cooper | |
| 8,110,141 B2 | 2/2012 | Cooper | |
| 8,137,023 B2 | 3/2012 | Greer | |
| 8,142,145 B2 | 3/2012 | Thut | |
| 8,178,037 B2 | 5/2012 | Cooper | |
| 8,328,540 B2 | 12/2012 | Wang | |
| 8,333,921 B2 | 12/2012 | Thut | |
| 8,337,746 B2 | 12/2012 | Cooper | |
| 8,361,379 B2 | 1/2013 | Cooper | |
| 8,366,993 B2 | 2/2013 | Cooper | |
| 8,409,495 B2 | 4/2013 | Cooper | |
| 8,440,135 B2 | 5/2013 | Cooper | |
| 8,449,814 B2 | 5/2013 | Cooper | |
| 8,475,594 B2 | 7/2013 | Bright et al. | |
| 8,475,708 B2 | 7/2013 | Cooper | |
| 8,480,950 B2 | 7/2013 | Jetten et al. | |
| 8,501,084 B2 | 8/2013 | Cooper | |
| 8,524,146 B2 | 9/2013 | Cooper | |
| 8,529,828 B2 | 9/2013 | Cooper | |
| 8,535,603 B2 | 9/2013 | Cooper | |
| 8,580,218 B2 | 12/2013 | Turenne et al. | |
| 8,613,884 B2 | 12/2013 | Cooper | |
| 8,714,914 B2 | 5/2014 | Cooper | |
| 8,753,563 B2 | 6/2014 | Cooper | |
| 8,840,359 B2 | 9/2014 | Vick et al. | |
| 8,899,932 B2 | 12/2014 | Tetkoskie et al. | |
| 8,915,830 B2 | 12/2014 | March et al. | |
| 8,920,680 B2 | 12/2014 | Mao | |
| 9,011,761 B2 | 4/2015 | Cooper | |
| 9,017,597 B2 | 4/2015 | Cooper | |
| 9,034,244 B2 | 5/2015 | Cooper | |
| 9,108,244 B2 | 8/2015 | Cooper | |
| 9,156,087 B2 | 10/2015 | Cooper | |
| 9,193,532 B2 | 11/2015 | March et al. | |
| 9,205,490 B2 | 12/2015 | Cooper | |
| 9,234,520 B2 | 1/2016 | Morando | |
| 9,273,376 B2 | 3/2016 | Lutes et al. | |
| 9,328,615 B2 | 5/2016 | Cooper | |
| 9,377,028 B2 | 6/2016 | Cooper | |
| 9,382,599 B2 | 7/2016 | Cooper | |
| 9,383,140 B2 | 7/2016 | Cooper | |
| 9,409,232 B2 | 8/2016 | Cooper | |
| 9,410,744 B2 | 8/2016 | Cooper | |
| 9,422,942 B2 | 8/2016 | Cooper | |
| 9,435,343 B2 | 9/2016 | Cooper | |
| 9,464,636 B2 | 10/2016 | Cooper | |
| 9,470,239 B2 | 10/2016 | Cooper | |
| 9,481,035 B2 | 11/2016 | Cooper | |
| 9,482,469 B2 | 11/2016 | Cooper | |
| 9,506,129 B2 | 11/2016 | Cooper | |
| 9,566,645 B2 | 2/2017 | Cooper | |
| 9,581,388 B2 | 2/2017 | Cooper | |
| 9,587,883 B2 | 3/2017 | Cooper | |
| 2001/0000465 A1 | 4/2001 | Thut | |
| 2002/0146313 A1 | 10/2002 | Thut | |
| 2002/0185790 A1 | 12/2002 | Klingensmith | |
| 2002/0185794 A1 | 12/2002 | Vincent | |
| 2003/0047850 A1 | 3/2003 | Areaux | |
| 2003/0075844 A1 | 4/2003 | Mordue et al. | |
| 2003/0082052 A1 | 5/2003 | Gilbert et al. | |
| 2003/0151176 A1 | 8/2003 | Ohno | |
| 2003/0201583 A1 | 10/2003 | Klingensmith | |
| 2004/0050525 A1 | 3/2004 | Kennedy et al. | |
| 2004/0076533 A1 | 4/2004 | Cooper | |
| 2004/0115079 A1 | 6/2004 | Cooper | |
| 2004/0262825 A1 | 12/2004 | Cooper | |
| 2005/0013713 A1 | 1/2005 | Cooper | |
| 2005/0013714 A1 | 1/2005 | Cooper | |
| 2005/0013715 A1 | 1/2005 | Cooper | |
| 2005/0053499 A1 | 3/2005 | Cooper | |
| 2005/0077730 A1 | 4/2005 | Thut | |
| 2005/0116398 A1 | 6/2005 | Tremblay | |
| 2006/0180963 A1 | 8/2006 | Thut | |
| 2007/0253807 A1 | 11/2007 | Cooper | |
| 2008/0202644 A1 | 8/2008 | Grassi | |
| 2008/0213111 A1 | 9/2008 | Cooper | |
| 2008/0230966 A1 | 9/2008 | Cooper | |
| 2008/0253905 A1 | 10/2008 | Morando et al. | |
| 2008/0304970 A1 | 12/2008 | Cooper | |
| 2008/0314548 A1 | 12/2008 | Cooper | |
| 2009/0054167 A1 | 2/2009 | Cooper | |
| 2009/0269191 A1 | 10/2009 | Cooper | |
| 2010/0104415 A1 | 4/2010 | Morando | |
| 2010/0200354 A1 | 8/2010 | Yagi et al. | |
| 2011/0133374 A1 | 6/2011 | Cooper | |
| 2011/0140319 A1 | 6/2011 | Cooper | |
| 2011/0142603 A1 | 6/2011 | Cooper | |
| 2011/0142606 A1 | 6/2011 | Cooper | |
| 2011/0148012 A1 | 6/2011 | Cooper | |
| 2011/0163486 A1 | 7/2011 | Cooper | |
| 2011/0210232 A1 | 9/2011 | Cooper | |
| 2011/0220771 A1 | 9/2011 | Cooper | |
| 2011/0303706 A1 | 12/2011 | Cooper | |
| 2012/0003099 A1 * | 1/2012 | Tetkoskie | F04D 7/065 416/223 R |
| 2012/0163959 A1 | 6/2012 | Morando | |
| 2013/0105102 A1 | 5/2013 | Cooper | |
| 2013/0142625 A1 | 6/2013 | Cooper | |
| 2013/0214014 A1 | 8/2013 | Cooper | |
| 2013/0224038 A1 | 8/2013 | Tetkoskie | |
| 2013/0292426 A1 | 11/2013 | Cooper | |
| 2013/0292427 A1 | 11/2013 | Cooper | |
| 2013/0299524 A1 | 11/2013 | Cooper | |
| 2013/0299525 A1 | 11/2013 | Cooper | |
| 2013/0306687 A1 | 11/2013 | Cooper | |
| 2013/0334744 A1 | 12/2013 | Tremblay | |
| 2013/0343904 A1 | 12/2013 | Cooper | |
| 2014/0041252 A1 | 2/2014 | Vild et al. | |
| 2014/0044520 A1 | 2/2014 | Tipton | |
| 2014/0083253 A1 | 3/2014 | Lutes et al. | |
| 2014/0210144 A1 | 7/2014 | Torres et al. | |
| 2014/0232048 A1 | 8/2014 | Howitt et al. | |
| 2014/0252701 A1 | 9/2014 | Cooper | |
| 2014/0261800 A1 | 9/2014 | Cooper | |
| 2014/0265068 A1 | 9/2014 | Cooper | |
| 2014/0271219 A1 | 9/2014 | Cooper | |
| 2014/0363309 A1 | 12/2014 | Henderson et al. | |
| 2015/0069679 A1 | 3/2015 | Henderson et al. | |
| 2015/0192364 A1 | 7/2015 | Cooper | |
| 2015/0217369 A1 | 8/2015 | Cooper | |
| 2015/0219112 A1 | 8/2015 | Cooper | |
| 2015/0219113 A1 | 8/2015 | Cooper | |
| 2015/0219114 A1 | 8/2015 | Cooper | |
| 2015/0224574 A1 | 8/2015 | Cooper | |
| 2015/0252807 A1 | 9/2015 | Cooper | |
| 2015/0285557 A1 | 10/2015 | Cooper | |
| 2015/0285558 A1 | 10/2015 | Cooper | |
| 2015/0323256 A1 | 11/2015 | Cooper | |
| 2015/0328682 A1 | 11/2015 | Cooper | |
| 2015/0328683 A1 | 11/2015 | Cooper | |
| 2016/0031007 A1 | 2/2016 | Cooper | |
| 2016/0040265 A1 | 2/2016 | Cooper | |
| 2016/0047602 A1 | 2/2016 | Cooper | |
| 2016/0053762 A1 | 2/2016 | Cooper | |
| 2016/0053814 A1 | 2/2016 | Cooper | |
| 2016/0082507 A1 | 3/2016 | Cooper | |
| 2016/0089718 A1 | 3/2016 | Cooper | |
| 2016/0091251 A1 | 3/2016 | Cooper | |
| 2016/0116216 A1 | 4/2016 | Schlicht et al. | |
| 2016/0221855 A1 | 8/2016 | Retorick et al. | |
| 2016/0250686 A1 | 9/2016 | Cooper | |

(56) References Cited

U.S. PATENT DOCUMENTS

| | | |
|---|---|---|
| 2016/0265535 A1 | 9/2016 | Cooper |
| 2016/0305711 A1 | 10/2016 | Cooper |
| 2016/0320129 A1 | 11/2016 | Cooper |
| 2016/0320130 A1 | 11/2016 | Cooper |
| 2016/0320131 A1 | 11/2016 | Cooper |
| 2016/0346836 A1 | 12/2016 | Henderson et al. |
| 2016/0348973 A1 | 12/2016 | Cooper |
| 2016/0348974 A1 | 12/2016 | Cooper |
| 2016/0348975 A1 | 12/2016 | Cooper |
| 2017/0037852 A1 | 2/2017 | Bright et al. |
| 2017/0038146 A1 | 2/2017 | Cooper |
| 2017/0045298 A1 | 2/2017 | Cooper |
| 2017/0056973 A1 | 3/2017 | Tremblay et al. |
| 2017/0082368 A1 | 3/2017 | Cooper |
| 2017/0106435 A1 | 4/2017 | Vincent |
| 2017/0198721 A1 | 7/2017 | Cooper |
| 2017/0219289 A1 | 8/2017 | Williams et al. |
| 2017/0241713 A1 | 8/2017 | Henderson et al. |
| 2017/0246681 A1 | 8/2017 | Tipton et al. |
| 2017/0276430 A1 | 9/2017 | Cooper |

FOREIGN PATENT DOCUMENTS

| | | |
|---|---|---|
| CA | 2244251 | 12/1996 |
| CA | 2305865 | 2/2000 |
| CA | 2176475 | 7/2005 |
| CH | 392268 | 9/1965 |
| DE | 1800446 | 12/1969 |
| EP | 0168250 | 1/1986 |
| EP | 0665378 | 2/1995 |
| EP | 1019635 | 6/2006 |
| GB | 543607 | 3/1942 |
| GB | 942648 | 11/1963 |
| GB | 1185314 | 3/1970 |
| GB | 2217784 | 3/1989 |
| JP | 58048796 | 3/1983 |
| JP | 63104773 | 5/1988 |
| JP | 5112837 | 5/1993 |
| MX | 227385 | 4/2005 |
| NO | 90756 | 1/1959 |
| RU | 416401 | 2/1974 |
| RU | 773312 | 10/1980 |
| WO | WO199808990 | 3/1998 |
| WO | WO199825031 | 6/1998 |
| WO | WO200009889 | 2/2000 |
| WO | WO2002012147 | 2/2002 |
| WO | WO2004029307 | 4/2004 |
| WO | 2010147932 | 12/2010 |
| WO | 2014055082 | 4/2014 |
| WO | 2014150503 | 9/2014 |
| WO | 2014185971 | 11/2014 |

OTHER PUBLICATIONS

USPTO; Notice of Reissue Examination Certificate dated Aug. 27, 2001 in U.S. Appl. No. 90/005,910.
"Response to Final Office Action and Request for Continued Examination for U.S. Appl. No. 09/275,627," Including Declarations of Haynes and Johnson, Apr. 16, 2001.
Document No. 504217: Excerpts from "Pyrotek Inc.'s Motion for Summary Judgment of Invalidity and Unenforceability of U.S. Pat. No. 7,402,276," Oct. 2, 2009.
Document No. 505026: Excerpts from "MMEI's Response to Pyrotek's Motion for Summary Judgment of Invalidity or Enforceability of U.S. Pat. No. 7,402,276," Oct. 9, 2009.
Document No. 507689: Excerpts from "MMEI's Pre-Hearing Brief and Supplemental Motion for Summary Judgment of Infringement of Claims 3-4, 15, 17-20, 26 and 28-29 of the '074 Patent and Motion for Reconsideration of the Validity of Claims 7-9 of the '276 Patent," Nov. 4, 2009.
Document No. 517158: Excerpts from "Reasoned Award," Feb. 19, 2010.
Document No. 525055: Excerpts from "Molten Metal Equipment Innovations, Inc.'s Reply Brief in Support of Application to Confirm Arbitration Award and Opposition to Motion to Vacate," May 12, 2010.
USPTO; Office Action dated Feb. 23, 1996 in U.S. Appl. No. 08/439,739.
USPTO; Office Action dated Aug. 15, 1996 in U.S. Appl. No. 08/439,739.
USPTO; Advisory Action dated Nov. 18, 1996 in U.S. Appl. No. 08/439,739.
USPTO; Advisory Action dated Dec. 9, 1996 in U.S. Appl. No. 08/439,739.
USPTO; Notice of Allowance dated Jan. 17, 1997 in U.S. Appl. No. 08/439,739.
USPTO; Office Action dated Jul. 22, 1996 in U.S. Appl. No. 08/489,962.
USPTO; Office Action dated Jan. 6, 1997 in U.S. Appl. No. 08/489,962.
USPTO; Interview Summary dated Mar. 4, 1997 in U.S. Appl. No. 08/489,962.
USPTO; Notice of Allowance dated Mar. 27, 1997 in U.S. Appl. No. 08/489,962.
USPTO; Office Action dated Sep. 23, 1998 in U.S. Appl. No. 08/759,780.
USPTO; Interview Summary dated Dec. 30, 1998 in U.S. Appl. No. 08/789,780.
USPTO; Notice of Allowance dated Mar. 17, 1999 in U.S. Appl. No. 08/789,780.
USPTO; Office Action dated Jul. 23, 1998 in U.S. Appl. No. 08/889,882.
USPTO; Office Action dated Jan. 21, 1999 in U.S. Appl. No. 08/889,882.
USPTO; Notice of Allowance dated Mar. 17, 1999 in U.S. Appl. No. 08/889,882.
USPTO; Office Action dated Feb. 26, 1999 in U.S. Appl. No. 08/951,007.
USPTO; Interview Summary dated Mar. 15, 1999 in U.S. Appl. No. 08/951,007.
USPTO; Office Action dated May 17, 1999 in U.S. Appl. No. 08/951,007.
USPTO; Notice of Allowance dated Aug. 27, 1999 in U.S. Appl. No. 08/951,007.
USPTO; Office Action dated Dec. 23, 1999 in U.S. Appl. No. 09/132,934.
USPTO; Notice of Allowance dated Mar. 9, 2000 in U.S. Appl. No. 09/132,934.
USPTO; Office Action dated Jan. 7, 2000 in U.S. Appl. No. 09/152,168.
USPTO; Notice of Allowance dated Aug. 7, 2000 in U.S. Appl. No. 09/152,168.
USPTO; Office Action dated Sep. 29, 1999 in U.S. Appl. No. 09/275,627.
USPTO; Office Action dated May 22, 2000 in U.S. Appl. No. 09/275,627.
USPTO; Office Action dated Nov. 14, 2000 in U.S. Appl. No. 09/275,627.
USPTO; Office Action dated May 21, 2001 in U.S. Appl. No. 09/275,627.
USPTO; Notice of Allowance dated Aug. 31, 2001 in U.S. Appl. No. 09/275,627.
USPTO; Office Action dated Jun. 15, 2000 in U.S. Appl. No. 09/312,361.
USPTO; Notice of Allowance dated Jan. 29, 2001 in U.S. Appl. No. 09/312,361.
USPTO; Office Action dated Jun. 22, 2001 in U.S. Appl. No. 09/569,461.
USPTO; Office Action dated Oct. 12, 2001 in U.S. Appl. No. 09/569,461.
USPTO; Office Action dated May 3, 2002 in U.S. Appl. No. 09/569,461.
USPTO; Advisory Action dated May 14, 2002 in U.S. Appl. No. 09/569,461.

(56) References Cited

OTHER PUBLICATIONS

USPTO; Office Action dated Dec. 4, 2002 in U.S. Appl. No. 09/569,461.
USPTO; Interview Summary dated Jan. 14, 2003 in U.S. Appl. No. 09/569,461.
USPTO; Notice of Allowance dated Jun. 24, 2003 in U.S. Appl. No. 09/569,461.
USPTO; Office Action dated Nov. 21, 2000 in U.S. Appl. No. 09/590,108.
USPTO; Office Action dated May 22, 2001 in U.S. Appl. No. 09/590,108.
USPTO; Notice of Allowance dated Sep. 10, 2001 in U.S. Appl. No. 09/590,108.
USPTO; Office Action dated Jan. 30, 2002 in U.S. Appl. No. 09/649,190.
USPTO; Office Action dated Oct. 4, 2002 in U.S. Appl. No. 09/649,190.
USPTO; Office Action dated Apr. 18, 2003 in U.S. Appl. No. 09/649,190.
USPTO; Notice of Allowance dated Nov. 21, 2003 in U.S. Appl. No. 09/649,190.
USPTO; Office Action dated Jun. 7, 2006 in U.S. Appl. No. 10/619,405.
USPTO; Final Office Action dated Feb. 20, 2007 in U.S. Appl. No. 10/619,405.
USPTO; Office Action dated Oct. 9, 2007 in U.S. Appl. No. 10/619,405.
USPTO; Final Office Action dated May 29, 2008 in U.S. Appl. No. 10/619,405.
USPTO; Interview Summary dated Aug. 22, 2008 in U.S. Appl. No. 10/619,405.
USPTO; *Ex Parte Quayle* dated Sep. 12, 2008 in U.S. Appl. No. 10/619,405.
USPTO; Interview Summary dated Oct. 16, 2008 in U.S. Appl. No. 10/619,405.
USPTO; Notice of Allowance dated Nov. 14, 2008 in U.S. Appl. No. 10/619,405.
USPTO; Office Action dated Mar. 20, 2006 in U.S. Appl. No. 10/620,318.
USPTO; Office Action dated Nov. 16, 2006 in U.S. Appl. No. 10/620,318.
USPTO; Final Office Action dated Jul. 25, 2007 in U.S. Appl. No. 10/620,318.
USPTO; Office Action dated Feb. 12, 2008 in U.S. Appl. No. 10/620,318.
USPTO; Final Office Action dated Oct. 16, 2008 in U.S. Appl. No. 10/620,318.
USPTO; Office Action dated Feb. 25, 2009 in U.S. Appl. No. 10/620,318.
USPTO; Final Office Action dated Oct. 8, 2009 in U.S. Appl. No. 10/620,318.
USPTO; Notice of Allowance dated Jan. 26, 2010 in U.S. Appl. No. 10/620,318.
USPTO; Office Action dated Nov. 15, 2007 in U.S. Appl. No. 10/773,101.
USPTO; Office Action dated Jun. 27, 2006 in U.S. Appl. No. 10/773,102.
USPTO; Final Office Action dated Mar. 6, 2007 in U.S. Appl. No. 10/773,102.
USPTO; Office Action dated Oct. 11, 2007 in U.S. Appl. No. 10/773,102.
USPTO; Interview Summary dated Mar. 18, 2008 in U.S. Appl. No. 10/773,102.
USPTO; Notice of Allowance dated Apr. 18, 2008 in U.S. Appl. No. 10/773,102.
USPTO; Office Action dated Jul. 24, 2006 in U.S. Appl. No. 10/773,105.
USPTO; Office Action dated Oct. 9, 2007 in U.S. Appl. No. 10/773,105.
USPTO; Interview Summary dated Jan. 25, 2008 in U.S. Appl. No. 10/773,105.
USPTO; Office Action dated May 19, 2008 in U.S. Appl. No. 10/773,105.
USPTO; Interview Summary dated Jul. 21, 2008 in U.S. Appl. No. 10/773,105.
USPTO; Notice of Allowance dated Sep. 29, 2008 in U.S. Appl. No. 10/773,105.
USPTO; Office Action dated Jan. 31, 2008 in U.S. Appl. No. 10/773,118.
USPTO; Final Office Action dated Aug. 18, 2008 in U.S. Appl. No. 10/773,118.
USPTO; Interview Summary dated Oct. 16, 2008 in U.S. Appl. No. 10/773,118.
USPTO; Office Action dated Dec. 15, 2008 in U.S. Appl. No. 10/773,118.
USPTO; Final Office Action dated May 1, 2009 in U.S. Appl. No. 10/773,118.
USPTO; Office Action dated Jul. 27, 2009 in U.S. Appl. No. 10/773,118.
USPTO; Final Office Action dated Feb. 2, 2010 in U.S. Appl. No. 10/773,118.
USPTO; Interview Summary dated Jun. 4, 2010 in U.S. Appl. No. 10/773,118.
USPTO; *Ex Parte Quayle* Action dated Aug. 25, 2010 in U.S. Appl. No. 10/773,118.
USPTO; Notice of Allowance dated Nov. 5, 2010 in U.S. Appl. No. 10/773,118.
USPTO; Office Action dated Mar. 16, 2005 in U.S. Appl. No. 10/827,941.
USPTO; Final Office Action dated Nov. 7, 2005 in U.S. Appl. No. 10/827,941.
USPTO; Office Action dated Jul. 12, 2006 in U.S. Appl. No. 10/827,941.
USPTO; Final Office Action dated Mar. 8, 2007 in U.S. Appl. No. 10/827,941.
USPTO; Office Action dated Oct. 29, 2007 in U.S. Appl. No. 10/827,941.
USPTO; Office Action dated Sep. 26, 2008 in U.S. Appl. No. 11/413,982.
USPTO; Office Action dated Dec. 11, 2009 in U.S. Appl. No. 11/766,617.
USPTO; Office Action dated Mar. 8, 2010 in U.S. Appl. No. 11/766,617.
USPTO; Final Office Action dated Sep. 20, 2010 in U.S. Appl. No. 11/766,617.
USPTO; Office Action dated Mar. 1, 2011 in U.S. Appl. No. 11/766,617.
USPTO; Final Office Action dated Sep. 22, 2011 in U.S. Appl. No. 11/766,617.
USPTO; Office Action dated Jan. 27, 2012 in U.S. Appl. No. 11/766,617.
USPTO; Notice of Allowance dated May 15, 2012 in U.S. Appl. No. 11/766,617.
USPTO; Supplemental Notice of Allowance dated Jul. 31, 2012 in U.S. Appl. No. 11/766,617.
USPTO; Notice of Allowance dated Aug. 24, 2012 in U.S. Appl. No. 11/766,617.
USPTO; Final Office Action dated Oct. 14, 2008 in U.S. Appl. No. 12/111,835.
USPTO; Office Action dated May 15, 2009 in U.S. Appl. No. 12/111,835.
USPTO; Office Action dated Mar. 31, 2009 in U.S. Appl. No. 12/120,190.
USPTO; Final Office Action dated Dec. 4, 2009 in U.S. Appl. No. 12/120,190.
USPTO; Office Action dated Jun. 28, 2010 in U.S. Appl. No. 12/120,190.
USPTO; Final Office Action dated Jan. 6, 2011 in U.S. Appl. No. 12/120,190.
USPTO; Office Action dated Jun. 27, 2011 in U.S. Appl. No. 12/120,190.

(56) References Cited

OTHER PUBLICATIONS

USPTO; Final Office Action dated Nov. 28, 2011 in U.S. Appl. No. 12/120,190.
USPTO; Notice of Allowance dated Feb. 6, 2012 in U.S. Appl. No. 12/120,190.
USPTO; Office Action dated Nov. 3, 2008 in U.S. Appl. No. 12/120,200.
USPTO; Final Office Action dated May 28, 2009 in U.S. Appl. No. 12/120,200.
USPTO; Office Action dated Dec. 18, 2009 in U.S. Appl. No. 12/120,200.
USPTO; Final Office Action dated Jul. 9, 2010 in U.S. Appl. No. 12/120,200.
USPTO; Office Action dated Jan. 21, 2011 in U.S. Appl. No. 12/120,200.
USPTO; Final Office Action dated Jul. 26, 2011 in U.S. Appl. No. 12/120,200.
USPTO; Final Office Action dated Feb. 3, 2012 in U.S. Appl. No. 12/120,200.
USPTO; Notice of Allowance dated Jan. 17, 2013 in U.S. Appl. No. 12/120,200.
USPTO; Office Action dated Jun. 16, 2009 in U.S. Appl. No. 12/146,770.
USPTO; Final Office Action dated Feb. 24, 2010 in U.S. Appl. No. 12/146,770.
USPTO; Office Action dated Jun. 9, 2010 in U.S. Appl. No. 12/146,770.
USPTO; Office Action dated Nov. 18, 2010 in U.S. Appl. No. 12/146,770.
USPTO; Final Office Action dated Apr. 4, 2011 in U.S. Appl. No. 12/146,770.
USPTO; Notice of Allowance dated Aug. 22, 2011 in U.S. Appl. No. 12/146,770.
USPTO; Notice of Allowance dated Nov. 1, 2011 in U.S. Appl. No. 12/146,770.
USPTO; Office Action dated Apr. 27, 2009 in U.S. Appl. No. 12/146,788.
USPTO; Final Office Action dated Oct. 15, 2009 in U.S. Appl. No. 12/146,788.
USPTO; Office Action dated Feb. 16, 2010 in U.S. Appl. No. 12/146,788.
USPTO; Final Office Action dated Jul. 13, 2010 in U.S. Appl. No. 12/146,788.
USPTO; Office Action dated Apr. 19, 2011 in U.S. Appl. No. 12/146,788.
USPTO; Notice of Allowance dated Aug. 19, 2011 in U.S. Appl. No. 12/146,788.
USPTO; Office Action dated Apr. 13, 2009 in U.S. Appl. No. 12/264,416.
USPTO; Final Office Action dated Oct. 8, 2009 in U.S. Appl. No. 12/264,416.
USPTO; Office Action dated Feb. 1, 2010 in U.S. Appl. No. 12/264,416.
USPTO; Final Office Action dated Jun. 30, 2010 in U.S. Appl. No. 12/264,416.
USPTO; Office Action dated Mar. 17, 2011 in U.S. Appl. No. 12/264,416.
USPTO; Final Office Action dated Jul. 7, 2011 in U.S. Appl. No. 12/264,416.
USPTO; Office Action dated Nov. 4, 2011 in U.S. Appl. No. 12/264,416.
USPTO; Final Office Action dated Jun. 8, 2012 in U.S. Appl. No. 12/264,416.
USPTO; Office Action dated Nov. 28, 2012 in U.S. Appl. No. 12/264,416.
USPTO; *Ex Parte Quayle* dated Apr. 3, 2013 in U.S. Appl. No. 12/264,416.
USPTO; Notice of Allowance dated Jun. 23, 2013 in U.S. Appl. No. 12/264,416.
USPTO; Office Action dated May 22, 2009 in U.S. Appl. No. 12/369,362.
USPTO; Final Office Action dated Dec. 14, 2009 in U.S. Appl. No. 12/369,362.
USPTO; Final Office Action dated Jun. 11, 2010 in U.S. Appl. No. 12/395,430.
USPTO; Office Action dated Nov. 24, 2010 in U.S. Appl. No. 12/395,430.
USPTO; Final Office Action dated Apr. 6, 2011 in U.S. Appl. No. 12/395,430.
USPTO; Office Action dated Aug. 18, 2011 in U.S. Appl. No. 12/395,430.
USPTO; Final Office Action dated Dec. 13, 2011 in U.S. Appl. No. 12/395,430.
USPTO; Advisory Action dated Feb. 22, 2012 in U.S. Appl. No. 12/395,430.
USPTO; Office Action dated Sep. 29, 2010 in U.S. Appl. No. 12/758,509.
USPTO; Final Office Action dated May 11, 2011 in U.S. Appl. No. 12/758,509.
USPTO; Office Action dated Feb. 1, 2012 in U.S. Appl. No. 12/853,201.
USPTO; Final Office Action dated Jul. 3, 2012 in U.S. Appl. No. 12/853,201.
USPTO; Notice of Allowance dated Jan. 31, 2013 in U.S. Appl. No. 12/853,201.
USPTO; Office Action dated Jan. 3, 2013 in U.S. Appl. No. 12/853,238.
USPTO; Office Action dated Dec. 18, 2013 in U.S. Appl. No. 12/853,238.
USPTO; Office Action dated Feb. 27, 2012 in U.S. Appl. No. 12/853,253.
USPTO; *Ex Parte Quayle* Action dated Jun. 27, 2012 in U.S. Appl. No. 12/853,253.
USPTO; Notice of Allowance dated Oct. 2, 2012 in U.S. Appl. No. 12/853,253.
USPTO; Office Action dated Mar. 12, 2012 in U.S. Appl. No. 12/853,255.
USPTO; Final Office Action dated Jul. 24, 2012 in U.S. Appl. No. 12/853,255.
USPTO; Office Action dated Jan. 18, 2013 in U.S. Appl. No. 12/853,255.
USPTO; Notice of Allowance dated Jun. 20, 2013 in U.S. Appl. No. 12/853,255.
USPTO; Office Action dated Apr. 19, 2012 in U.S. Appl. No. 12/853,268.
USPTO; Final Office Action dated Sep. 17, 2012 in U.S. Appl. No. 12/853,268.
USPTO; Notice of Allowance dated Nov. 21, 2012 in U.S. Appl. No. 12/853,268.
USPTO; Office Action dated May 29, 2012 in U.S. Appl. No. 12/878,984.
USPTO; Office Action dated Oct. 3, 2012 in U.S. Appl. No. 12/878,984.
USPTO; Final Office Action dated Jan. 25, 2013 in U.S. Appl. No. 12/878,984.
USPTO; Notice of Allowance dated Mar. 28, 2013 in U.S. Appl. No. 12/878,984.
USPTO; Office Action dated Sep. 22, 2011 in U.S. Appl. No. 12/880,027.
USPTO; Final Office Action dated Feb. 16, 2012 in U.S. Appl. No. 12/880,027.
USPTO; Office Action dated Dec. 14, 2012 in U.S. Appl. No. 12/880,027.
USPTO; Final Office Action dated Jul. 11, 2013 in U.S. Appl. No. 12/880,027.
USPTO; Office Action dated Dec. 18, 2013 in U.S. Appl. No. 12/895,796.
USPTO; Office Action dated Aug. 25, 2011 in U.S. Appl. No. 13/047,719.
USPTO; Final Office Action dated Dec. 16, 2011 in U.S. Appl. No. 13/047,719.

(56) References Cited

OTHER PUBLICATIONS

USPTO; Office Action dated Sep. 11, 2012 in U.S. Appl. No. 13/047,719.
USPTO; Notice of Allowance dated Feb. 28, 2013 in U.S. Appl. No. 13/047,719.
USPTO; Office Action dated Aug. 25, 2011 in U.S. Appl. No. 13/047,747.
USPTO; Final Office Action dated Feb. 7, 2012 in U.S. Appl. No. 13/047,747.
USPTO; Notice of Allowance dated Apr. 18, 2012 in U.S. Appl. No. 13/047,747.
USPTO; Office Action dated Dec. 13, 2012 in U.S. Appl. No. 13/047,747.
USPTO; Notice of Allowance dated Apr. 3, 2013 in U.S. Appl. No. 13/047,747.
USPTO; Office Action dated Apr. 12, 2013 in U.S. Appl. No. 13/106,853.
USPTO; Notice of Allowance dated Aug. 23, 2013 in U.S. Appl. No. 13/106,853.
USPTO; Office Action dated Apr. 18, 2012 in U.S. Appl. No. 13/252,145.
USPTO; Final Office Action dated Sep. 17, 2012 in U.S. Appl. No. 13/252,145.
USPTO; Notice of Allowance dated Nov. 30, 2012 in U.S. Appl. No. 13/252,145.
USPTO; Office Action dated Aug. 1, 2013 in U.S. Appl. No. 12/877,988.
USPTO; Notice of Allowance dated Dec. 24, 2013 in U.S. Appl. No. 12/877,988.
USPTO; Office Action dated Sep. 6, 2013 in U.S. Appl. No. 13/725,383.
USPTO; Office Action dated Oct. 24, 2013 in U.S. Appl. No. 13/725,383.
USPTO; Final Office Action dated Mar. 25, 2014 in U.S. Appl. No. 13/725,383.
USPTO; Office Action dated Sep. 18, 2012 in U.S. Appl. No. 13/752,312.
USPTO; Final Office Action dated Jan. 27, 2014 in U.S. Appl. No. 13/752,312.
USPTO; Office Action dated Sep. 11, 2013 in U.S. Appl. No. 13/756,468.
USPTO; Notice of Allowance dated Feb. 3, 2014 in U.S. Appl. No. 13/756,468.
CIPO; Office Action dated Dec. 4, 2001 in Application No. 2,115,929.
CIPO; Office Action dated Apr. 22, 2002 in Application No. 2,115,929.
CIPO; Notice of Allowance dated Jul. 18, 2003 in Application No. 2,115,929.
CIPO; Office Action dated Jun. 30, 2003 in Application No. 2,176,475.
CIPO; Notice of Allowance dated Sep. 15, 2004 in Application No. 2,176,475.
CIPO; Office Action dated May 29, 2000 in Application No. 2,242,174.
CIPO; Office Action dated Feb. 22, 2006 in Application No. 2,244,251.
CIPO; Office Action dated Mar. 27, 2007 in Application No. 2,244,251.
CIPO; Office Action dated Sep. 18, 2002 in Application No. 2,305,865.
CIPO; Notice of Allowance dated May 2, 2003 in Application No. 2,305,865.
EPO; Examination Report dated Oct. 6, 2008 in Application No. 08158682.
EPO; Office Action dated Jan. 26, 2010 in Application No. 08158682.
EPO; Office Action dated Feb. 15, 2011 in Application No. 08158682.
EPO; Search Report dated Nov. 9, 1998 in Application No. 98112356.
EPO; Office Action dated Feb. 6, 2003 in Application No. 99941032.
EPO; Office Action dated Aug. 20, 2004 in Application No. 99941032.
PCT; International Search Report or Declaration dated Nov. 15, 1999 in Application No. PCT/US1999/18178.
PCT; International Search Report or Declaration dated Oct. 9, 1998 in Application No. PCT/US1999/22440.
USPTO; Final Office Action dated May 19, 2014 in U.S. Appl. No. 12/853,238.
USPTO; Office Action dated Mar. 31, 2015 in U.S. Appl. No. 12/853,238.
USPTO; Office Action dated Jul. 16, 2014 in U.S. Appl. No. 12/880,027.
USPTO; *Ex Parte Quayle* Office Action dated Dec. 19, 2014 in U.S. Appl. No. 12/880,027.
USPTO; Notice of Allowance dated Apr. 8, 2015 in U.S. Appl. No. 12/880,027.
USPTO; Final Office Action dated Jun. 3, 2014 in U.S. Appl. No. 12/895,796.
USPTO; Office Action dated Nov. 17, 2014 in U.S. Appl. No. 12/895,796.
USPTO; Office Action dated Sep. 1, 2015 in U.S. Appl. No. 12/895,796.
USPTO; Final Office Action dated May 23, 2014 in U.S. Appl. No. 13/752,312.
USPTO; Notice of Allowance dated Dec. 17, 2014 in U.S. Appl. No. 13/752,312.
USPTO; Office Action dated Mar. 3, 2015 in U.S. Appl. No. 13/725,383.
USPTO; Office Action dated Nov. 20, 2015 in U.S. Appl. No. 13/725,383.
USPTO; Office Action dated Sep. 10, 2014 in U.S. Appl. No. 13/791,952.
USPTO; Office Action dated Sep. 23, 2014 in U.S. Appl. No. 13/843,947.
USPTO; Office Action dated Nov. 28, 2014 in U.S. Appl. No. 13/843,947.
USPTO; Final Office dated Apr. 10, 2015 in U.S. Appl. No. 13/843,947.
USPTO; Final Office Action dated Sep. 11, 2015 in U.S. Appl. No. 13/843,947.
USPTO; Office Action dated Sep. 22, 2014 in U.S. Appl. No. 13/830,031.
USPTO; Office Action dated Sep. 25, 2014 in U.S. Appl. No. 13/838,601.
USPTO; Final Office Action dated Mar. 3, 2015 in U.S. Appl. No. 13/838,601.
USPTO; Office Action dated Jul. 24, 2015 in U.S. Appl. No. 13/838,601.
USPTO; Office Action dated Dec. 14, 2015 in U.S. Appl. No. 14/687,806.
USPTO; Notice of Allowance dated Sep. 20, 2012 in U.S. Appl. No. 12/395,430.
USPTO; Office Action dated Jan. 20, 2016 in U.S. Appl. No. 12/853,238.
USPTO; *Ex Parte Quayle* Action dated Jan. 25, 2016 in U.S. Appl. No. 13/843,947.
USPTO; Office Action dated Jan. 12, 2016 in U.S. Appl. No. 13/802,203.
USPTO; Notice of Allowance dated Jan. 15, 2016 in U.S. Appl. No. 14/027,237.
USPTO; *Ex Parte Quayle* Action dated Nov. 4, 2015 in U.S. Appl. No. 14/027,237.
USPTO; Final Office Action dated Feb. 23, 2016 in U.S. Appl. No. 13/841,594.
USPTO; Office Action dated Dec. 17, 2015 in U.S. Appl. No. 14/286,442.
USPTO; Office Action dated Dec. 23, 2015 in U.S. Appl. No. 14/662,100.

(56) References Cited

OTHER PUBLICATIONS

USPTO; Office Action dated Dec. 18, 2015 in U.S. Appl. No. 14/689,879.
USPTO; Office Action dated Dec. 15, 2015 in U.S. Appl. No. 14/690,064.
USPTO; Office Action dated Dec. 31, 2015 in U.S. Appl. No. 14/690,099.
USPTO; Office Action dated Jan. 4, 2016 in U.S. Appl. No. 14/712,435.
USPTO; Office Action dated Feb. 11, 2016 in U.S. Appl. No. 14/690,174.
USPTO; Office Action dated Feb. 25, 2016 in U.S. Appl. No. 13/841,938.
USPTO; Notice of Allowance dated Mar. 8, 2016 in U.S. Appl. No. 13/973,962.
USPTO; Office Action dated Mar. 10, 2016 in U.S. Appl. No. 14/690,218.
USPTO; Notice of Allowance dated Mar. 11, 2016 in U.S. Appl. No. 13/843,947.
USPTO; Notice of Allowance dated Apr. 11, 2016 in U.S. Appl. No. 14/690,064.
USPTO; Notice of Allowance dated Apr. 12, 2016 in U.S. Appl. No. 14/027,237.
USPTO; Final Office Action dated May 2, 2016 in U.S. Appl. No. 14/687,806.
USPTO; Office action dated May 4, 2016 in U.S. Appl. No. 14/923,296.
USPTO; Notice of Allowance dated May 6, 2016 in U.S. Appl. No. 13/725,383.
USPTO; Notice of Allowance dated May 8, 2016 in U.S. Appl. No. 13/802,203.
USPTO; Office Action dated May 9, 2016 in U.S. Appl. No. 14/804,157.
USPTO; Office Action dated May 19, 2016 in U.S. Appl. No. 14/745,845.
USPTO; Office Action dated May 27, 2016 in U.S. Appl. No. 14/918,471.
USPTO; Office Action dated Jun. 6, 2016 in U.S. Appl. No. 14/808,935.
USPTO; Final Office Action dated Jun. 15, 2016 in U.S. Appl. No. 14/689,879.
USPTO; Notice of Allowance dated Jul. 7, 2016 in U.S. Appl. No. 14/804,157.
USPTO; Notice of Allowance dated Jul. 7, 2016 in U.S. Appl. No. 14/690,218.
USPTO; Notice of Allowance dated Jul. 7, 2016 in U.S. Appl. No. 14/690,099.
USPTO; Notice of Allowance dated Jul. 7, 2016 in U.S. Appl. No. 14/662,100.
USPTO; Notice of Allowance dated Jul. 20, 2016 in U.S. Appl. No. 14/715,435.
USPTO; Office Action dated Aug. 1, 2016 in U.S. Appl. No. 15/153,735.
USPTO; Office Action dated Aug. 15, 2016 in U.S. Appl. No. 14/811,655.
USPTO; Office Action dated Aug. 17, 2016 in U.S. Appl. No. 14/959,758.
USPTO; Final Office Action dated Aug. 10, 2016 in U.S. Appl. No. 12/853,238.
USPTO; Final Office Action dated Aug. 26, 2016 in U.S. Appl. No. 14/923,296.
USPTO; Office Action dated Aug. 29, 2016 in U.S. Appl. No. 14/687,806.
USPTO; Final Office Action dated Sep. 15, 2016 in U.S. Appl. No. 14/745,845.
USPTO; Office Action dated Sep. 15, 2016 in U.S. Appl. No. 14/746,593.
USPTO; Office Action dated Sep. 22, 2016 in U.S. Appl. No. 13/841,594.
USPTO; Notice of Allowance dated Sep. 28, 2016 in U.S. Appl. No. 14/918,471.
USPTO; Office Action dated Oct. 11, 2016 in U.S. Appl. No. 13/841,938.
USPTO; Office Action dated Oct. 27, 2016 in U.S. Appl. No. 14/689,879.
USPTO; Notice of Allowance dated Nov. 25, 2016 in U.S. Appl. No. 15/153,735.
USPTO; Notice of Allowance dated Nov. 29, 2016 in U.S. Appl. No. 14/808,935.
USPTO; Notice of Allowance dated Dec. 27, 2016 in U.S. Appl. No. 14/687,806.
USPTO; Notice of Allowance dated Dec. 30, 2016 in U.S. Appl. No. 14/923,296.
USPTO; Notice of Allowance dated Mar. 13, 2017 in U.S. Appl. No. 14/923,296.
USPTO; Final Office Action dated Mar. 17, 2017 in U.S. Appl. No. 14/811,655.
USPTO; Office Action dated Mar. 17, 2017 in U.S. Appl. No. 14/880,998.
USPTO; Final Office Action dated Mar. 29, 2017 in U.S. Appl. No. 14/959,758.
USPTO; Final Office Action dated Apr. 3, 2017 in U.S. Appl. No. 14/745,845.
USPTO; Office Action dated Apr. 11, 2017 in U.S. Appl. No. 14/959,811.
USPTO; Office Action dated Apr. 12, 2017 in U.S. Appl. No. 14/746,593.
USPTO; Office Action dated Apr. 20, 2017 in U.S. Appl. No. 14/959,653.
USPTO; Final Office Action dated May 10, 2017 in U.S. Appl. No. 14/689,879.
USPTO; Final Office Action dated Jun. 15, 2017 in U.S. Appl. No. 13/841,938.
USPTO; Office Action dated Aug. 1, 2017 in U.S. Appl. No. 14/811,655.
USPTO; Office Action dated Aug. 22, 2017 in U.S. Appl. No. 15/194,544.
USPTO; Office Action dated Aug. 18, 2017 in U.S. Appl. No. 14/745,845.
USPTO; Notice of Allowance dated Aug. 31, 2017 in U.S. Appl. No. 14/959,653.
USPTO; Office Action dated Sep. 1, 2017 in U.S. Appl. No. 14/689,879.
USPTO; Notice of Allowance dated Sep. 26, 2017 in U.S. Appl. No. 14/811,655.
USPTO; Final Office Action dated Sep. 26, 2017 in U.S. Appl. No. 14/959,811.
USPTO; Notice of Allowance dated Sep. 29, 2017 in U.S. Appl. No. 15/194,544.
USPTO; Non-Final Office Action dated Oct. 4, 2017 in U.S. Appl. No. 12/853,238.
USPTO; Non-Final Office Action dated Oct. 13, 2017 in U.S. Appl. No. 15/205,700.
USPTO; Non-Final Office Action dated Oct. 18, 2017 in U.S. Appl. No. 15/205,878.
USPTO; Non-Final Office Action dated Nov. 1, 2017 in U.S. Appl. No. 15/209,660.
USPTO; Notice of Allowance dated Nov. 13, 2017 in U.S. Appl. No. 14959811.
USPTO; Non-Final Office Action dated Nov. 14, 2017 in U.S. Appl. No. 15/233,882.
USPTO; Notice of Allowance dated Nov. 16, 2017 in U.S. Appl. No. 15/194,544.
USPTO; Non-Final Office Action dated Nov. 16, 2017 in U.S. Appl. No. 15/233,946.
USPTO; Non-Final Office Action dated Nov. 17, 2017 in U.S. Appl. No. 13/841,938.
USPTO; Non-Final Office Action dated Nov. 20, 2017 in U.S. Appl. No. 14/791,166.
USPTO; Non-Final Office Action dated Dec. 4, 2017 in U.S. Appl. No. 15/234,490.

(56) References Cited

OTHER PUBLICATIONS

USPTO; Non-Final Office Action dated Dec. 6, 2017 in U.S. Appl. No. 14/791,137.

* cited by examiner

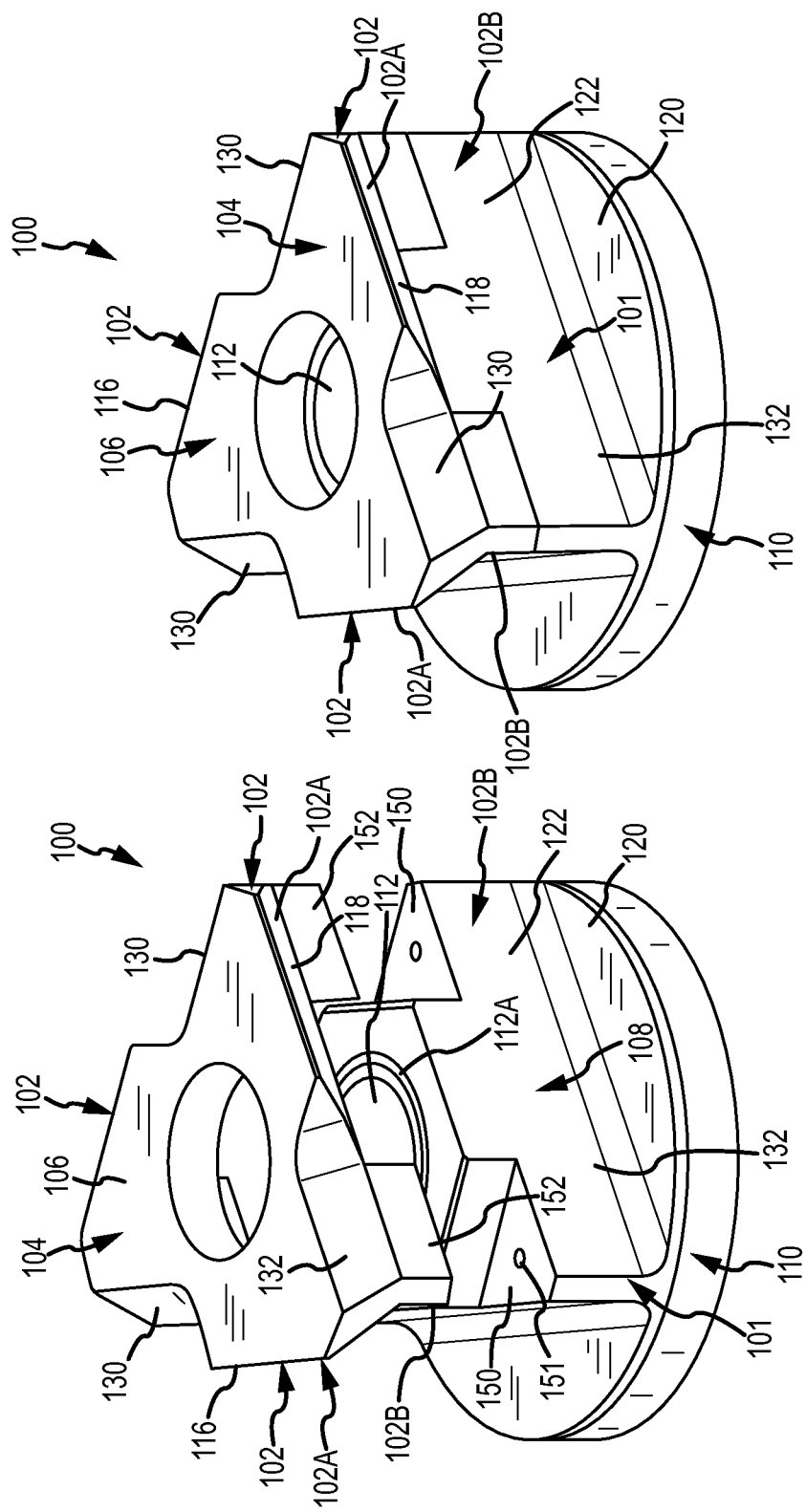

MOLTEN METAL ROTOR WITH HARDENED TOP

FIELD OF THE INVENTION

The present invention relates to a rotor for pumping molten metal, the rotor having a hardened top wherein at least some of the ceramic top preferably forms part of one or more rotor blades. The purpose of the hardened top is to decrease wear on the portions of the rotor that are struck by dross or other hard objects found in molten metal.

BACKGROUND OF THE INVENTION

As used herein, the term "molten metal" means any metal or combination of metals in liquid form, such as aluminum, copper, iron, zinc and alloys thereof. The term "gas" means any gas or combination of gases, including argon, nitrogen, chlorine, fluorine, freon, and helium, that are released into molten metal.

Known molten-metal pumps include a pump base (also called a housing or casing), one or more inlets (an inlet being an opening in the housing to allow molten metal to enter a pump chamber), a pump chamber, which is an open area formed within the housing, and a discharge, which is a channel or conduit of any structure or type communicating with the pump chamber (in an axial pump the chamber and discharge may be the same structure or different areas of the same structure) leading from the pump chamber to an outlet, which is an opening formed in the exterior of the housing through which molten metal exits the casing. An impeller, also called a rotor, is mounted in the pump chamber and is connected to a drive system. The drive system is typically an impeller shaft connected to one end of a drive shaft, the other end of the drive shaft being connected to a motor. Often, the impeller shaft is comprised of graphite, the motor shaft is comprised of steel, and the two are connected by a coupling. As the motor turns the drive shaft, the drive shaft turns the impeller and the impeller pushes molten metal out of the pump chamber, through the discharge, out of the outlet and into the molten metal bath. Most molten metal pumps are gravity fed, wherein gravity forces molten metal through the inlet and into the pump chamber as the impeller pushes molten metal out of the pump chamber.

A number of submersible pumps used to pump molten metal (referred to herein as molten metal pumps) are known in the art. For example, U.S. Pat. No. 2,948,524 to Sweeney et al., U.S. Pat. No. 4,169,584 to Mangalick, U.S. Pat. No. 5,203,681 to Cooper, U.S. Pat. No. 6,093,000 to Cooper and U.S. Pat. No. 6,123,523 to Cooper, and U.S. Pat. No. 6,303,074 to Cooper, all disclose molten metal pumps. The disclosures of the patents to Cooper noted above are incorporated herein by reference, as are U.S. Pat. Nos. 7,402,276 and 7,507,367. The term submersible means that when the pump is in use, its base is at least partially submerged in a bath of molten metal.

Three basic types of pumps for pumping molten metal, such as molten aluminum, are utilized: circulation pumps, transfer pumps and gas-release pumps. Circulation pumps are used to circulate the molten metal within a bath, thereby generally equalizing the temperature of the molten metal. Most often, circulation pumps are used in a reverbatory furnace having an external well. The well is usually an extension of the charging well where scrap metal is charged (i.e., added).

Transfer pumps are generally used to transfer molten metal from the external well of a reverbatory furnace to a different location such as a ladle or another furnace.

Gas-release pumps, such as gas-injection pumps, circulate molten metal while releasing a gas into the molten metal. In the purification of molten metals, particularly aluminum, it is frequently desired to remove dissolved gases such as hydrogen, or dissolved metals, such as magnesium, from the molten metal. As is known by those skilled in the art, the removing of dissolved gas is known as "degassing" while the removal of magnesium is known as "demagging." Gas-release pumps may be used for either of these purposes or for any other application for which it is desirable to introduce gas into molten metal. Gas-release pumps generally include a gas-transfer conduit having a first end that is connected to a gas source and a second submerged in the molten metal bath. Gas is introduced into the first end and is released from the second end into the molten metal. The gas may be released downstream of the pump chamber into either the pump discharge or a metal-transfer conduit extending from the discharge, or into a stream of molten metal exiting either the discharge or the metal-transfer conduit. Alternatively, gas may be released into the pump chamber or upstream of the pump chamber at a position where it enters the pump chamber. A system for releasing gas into a pump chamber is disclosed in U.S. Pat. No. 6,123,523 to Cooper. Furthermore, gas may be released into a stream of molten metal passing through a discharge or metal-transfer conduit wherein the position of a gas-release opening in the metal-transfer conduit enables pressure from the molten metal stream to assist in drawing gas into the molten metal stream. Such a structure and method is disclosed in a copending application entitled "System for Releasing Gas Into Molten Metal," invented by Paul V. Cooper, and filed on Feb. 4, 2004, the disclosure of which is incorporated herein by reference.

When a conventional molten metal pump is operated, the rotor rotates within the pump housing and the pump housing, inlet and pump chamber remain stationary relative to the rotor, i.e., they do not rotate. A problem with such molten metal pumps is that the molten metal in which it operates includes solid particles, such as dross and brick. As the rotor rotates molten metal including the solid particles enters the pump chamber through the inlet. A solid particle may lodge between the moving rotor and the stationary inlet, potentially jamming the rotor and potentially damaging one or more of the pump components, such as the rotor or rotor shaft of the pump.

Many attempts have been made to solve this problem, including the use of filters or disks to prevent solid particles from entering the inlet and the use of a non-volute pump chamber to increase the space between the inlet and rotor to allow solid pieces to pass into the pump chamber without jamming, where they can be pushed through the discharge by the action of the rotor.

Gas-release pumps generally include a gas-transfer conduit having a first end that is connected to a gas source and a second end submerged in the molten metal bath. Gas is introduced into the first end and is released from the second end into the molten metal. The gas may be released downstream of the pump chamber into either the pump discharge or a metal-transfer conduit extending from the discharge, or into a stream of molten metal exiting either the discharge or the metal-transfer conduit. Alternatively, gas may be released into the pump chamber or upstream of the pump chamber at a position where molten metal enters the pump chamber.

The materials forming the components that contact the molten metal bath should remain relatively stable in the bath. Structural refractory materials, such as graphite or ceramics, that are resistant to disintegration by corrosive attack from the molten metal may be used. As used herein "ceramics" or "ceramic" refers to any oxidized metal (including silicon) or carbon-based material, excluding graphite, capable of being used in the environment of a molten metal bath. "Graphite" means any type of graphite, whether or not chemically treated. Graphite is particularly suitable for being formed into pump components because it is (a) soft and relatively easy to machine, (b) not as brittle as ceramics and less prone to breakage, and (c) less expensive than ceramics.

SUMMARY OF THE INVENTION

The present invention relates to rotors used for pumping molten metal wherein the rotor has a hardened top to alleviate damage to the rotor caused by dross or other hard particles striking the rotor as molten metal enters the chamber of a molten metal pump in which the rotor is retained. The top is at least twice as hard as the body portion of the rotor, and the top preferably covers the entire top surface of the rotor including the tops of the rotor blades.

In one embodiment, the hardened top extends to include all or part of the surface of the rotor blades that move molten metal into the pump chamber or that push molten metal outward towards the wall of the pump chamber. Aspects of the invention can be utilized on any molten metal rotor design.

BRIEF DESCRIPTION OF THE DRAWINGS

FIG. 3 shows a perspective, side view of the rotor of FIG. 1 with the top not assembled to the body.

FIG. 4 shows a perspective, side view of the rotor of FIG. 1 with the top assembled to the body.

DETAILED DESCRIPTION OF PREFERRED EMBODIMENTS

Figure 1:
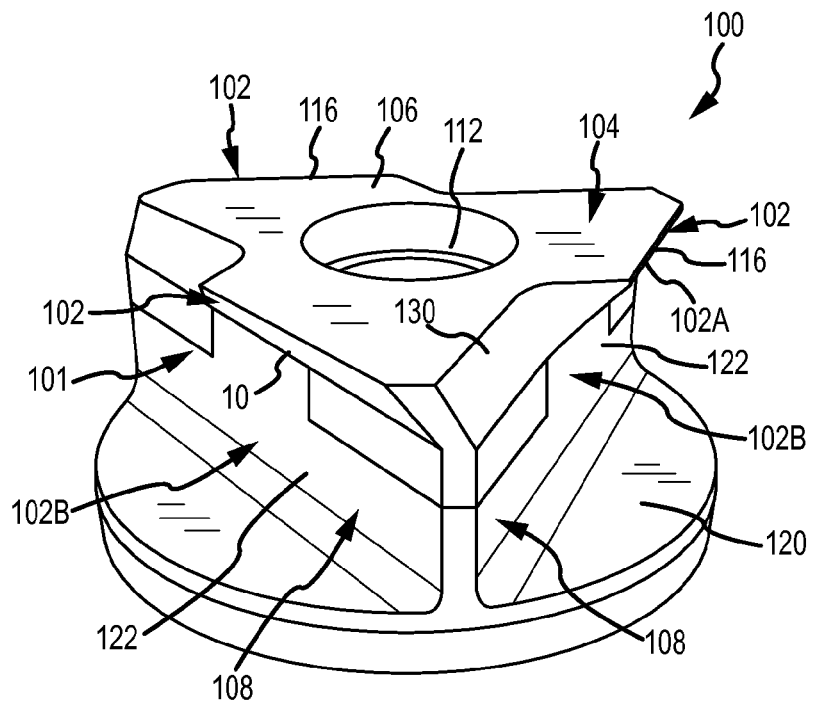
FIG. 1 shows a front, perspective view of a rotor according to the invention.

As used herein the relative hardness of materials is determined by the MOHS hardness scale. On the MOHS hardness scale, treated graphite may have a hardness between 1.5 and 2.5, whereas silicon carbide generally has a hardness of 9-10.

Turning now to the drawings, where the purpose is to describe a preferred embodiment of the invention and not to limit same, systems and devices according to the invention will be described.

FIGS. 1-4 show one preferred rotor according to aspects of the invention. Rotor 100 as shown preferably has three identical rotor blades (also called "vanes" herein) 102. As used herein, a rotor blade (or "vane") is a structure separate from and spaced from other rotor blades. In rotor 100 each blade is dual flow, meaning that it has a first portion 102A that directs molten metal either downward or upward (if the rotor is used on a bottom feed pump) towards a second portion 102B that directs molten metal outward.

A rotor according to aspects of the invention has a body (or body portion) 101 with a hardened top surface 106. Rotor 100 may have a flow blocking and bearing plate 110. As shown, flow blocking and bearing plate 110 is cemented to the bottom 120 of rotor 100. If rotor 100 is used on a bottom feed pump, the flow blocking and bearing plate 110 may be at the top of the rotor (in essence, the rotor would be turned upside down, with the blades at the bottom, but the rotor shaft attachment mechanism would still be at the top). The flow blocking and bearing plate 110 is preferably comprised of a hard, wear-resistant material, such as silicon carbide. Alternatively, a rotor according to the invention may not have a flow blocking and bearing plate.

Rotor 100 further includes a connective portion 112, which is preferably a threaded bore, but can be any structure capable of drivingly engaging a rotor shaft (not shown). It is most preferred that the outer surface of the end of the rotor shaft that is received in portion 112 has tapered threads and connective portion 112 be threaded to receive the tapered threads.

The preferred dimensions of rotor 100 will depend upon the size of the pump chamber or other structure in which it is received.

Preferably each vane 102 has the same configuration so only one vane 102 shall be described. Each vane 102 preferably includes a horizontally-oriented first portion 102A and a vertically-oriented second portion 102B. The respective vertical and horizontal orientation of the portions described herein is in reference to a rotor positioned in a standard pump having an input port in its top surface. The invention, however, covers any rotor for use in a molten-metal pumping application, whether the flow of molten metal is first contacting the rotor at the top or bottom or both. It will be therefore understood that the terms "horizontal" and "vertical" refer to the rotor as shown in the orientation in FIGS. 1-4.

Top surface 106 is preferably flush with a pump chamber inlet, if used with a pump chamber.

Section 102A preferably has a leading edge 116 and an angled surface (or first surface) 118. Surface 118 is angled (as used herein the term angled refers to both a substantially planar surface, or a curved surface, or a multifaceted surface) such that, as rotor 100 turns (as shown it turns in a clockwise direction) surface 118 directs molten metal towards second portion 102B. Any surface that functions to direct molten metal towards second portion 102B can be used, but it is preferred that surface 118 is substantially planar and formed at a 30°-60°, and most preferably, a 45° angle.

Portion 102B, which is preferably vertical (but can be angled or curved), extends from the bottom of section 102A to the top of base (or bottom) 120. Portion 102B has a leading face (or second surface) 122. Leading face 122 is preferably planar and vertical, although it can be of any configuration that directs molten metal outward, such as towards the wall of a pump chamber or other structure in which the rotor 100 is housed.

A recess 130 is formed in top portion 104 and preferably extends from top surface 106 to at least as far as the trailing face 132 of second portion 102B. As shown, recess 130 begins at a position on surface 106 slightly forward of face 132 and terminates at a position even with trailing face 132. The purpose of recess 130 is to reduce the area of top surface 106, thereby creating a larger opening for more molten metal to enter into the rotor 100 thus enabling rotor 100 to move more molten metal per rotor revolution.

The hardened top 104 is shown in FIGS. 1-4. The hardened top (or entrance to the rotor, because what is shown as the top in the Figures may be at the bottom on a bottom-feed pump or on both the top and bottom if no flow blocking and bearing plate is used) preferably is at least twice as hard as the body portion 101, or 2-3 times harder than the body portion 101, or 2-4 times harder than the body portion 101, or 2-5 times harder than the body portion 101. In one preferred embodiment, the body portion 101 is graphite and the top 104 is silicon carbide. At least top surface 106 includes the harder material of the hardened top 104, and as shown the hardened top includes the first portion 102A of each rotor blade 102, which includes surface 118. Additionally, it is preferred that the hardened top 104 include a part of second portion 102B (and surface 122) immediately beneath surface 118, and recess 130, and a part of trailing face 132 immediately beneath trailing face 132.

FIG. 3 shows hardened top 104 prior to being assembled to the body portion. In order to secure the top 104 and body portion, it is preferred that portions of the corners of each blade section on body 101 be cut out to create recesses or gaps 150 and that the top portion 106 has sections 152 designed to fill gaps 150 when cemented in place. The mating of sections 152 and gaps 150 helps secure the top 104 and body portion to alleviate the possibility that they will come apart during use.

Additionally, gaps 150 may have openings 151 that mate with pins (not shown) in sections 152, or gaps 150 and sections 152 may have openings that receive dowel pins (not shown) to help secure top 104 to the body portion. The center opening 112 in the body portion may also include a locating ring 112A formed therein, which mates with an extending portion (not shown) in the top 104 to properly center the two.

A similar hardened top may be utilized in a rotor device such as the one described in U.S. Pat. No. 7,402,276.

Figure 2:
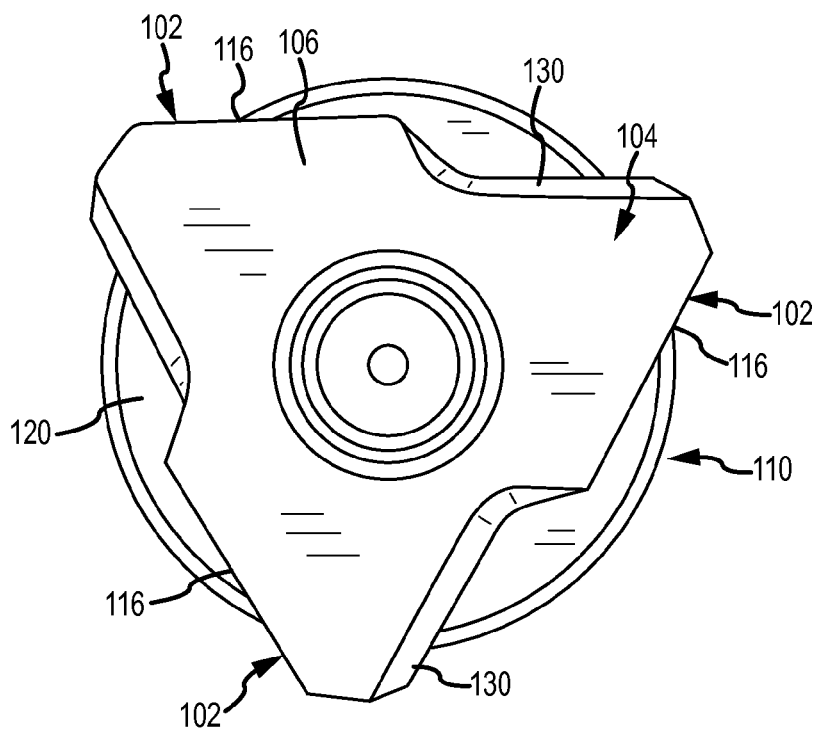
FIG. 2 shows a top view of the rotor of FIG. 1.

The flow blocking and bearing plate 110 has a circumference and the first portion 102A of each blade 102 preferably extends beyond the circumference, as best seen in FIG. 2. The first portion 102A of each blade 102 has a leading edge 116, a recess 130 and a connecting portion that connects the leading edge 116 and the recess 130. As shown in the exemplary embodiment: (a) the entire leading edge 116 of each blade 102 is part of the hardened top 104; (b) the entire recess 130 of each blade 102 is part of the hardened top 104, and (c) the entire first surface 118 is part of the hardened top 104. The exemplary embodiment also shows: (d) part of the leading face 122 is part of the hardened top 104, and (e) part of the trailing surface 132 is part of the hardened top 104.

Having thus described some embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired result.

What is claimed is:

1. A rotor for use in a molten metal pump, the rotor comprising
   (a) a graphite body;
   (b) a plurality of blades, wherein each blade has a first portion and a second portion, wherein the first portion is above the second portion and is configured to push molten metal downwards towards the second portion, and the second portion is configured to push the molten metal outward;
   (c) a hardened top portion comprising material at least twice as hard as the graphite body;
   (d) wherein the hardened top portion forms at least part of the first portion and at least part of the second portion.

2. The rotor of claim 1 wherein the hardened top portion is comprised of material between 2-3 times as hard as the graphite body.

3. The rotor of claim 1 wherein the hardened top portion is comprised of material between 2-4 times as hard as the graphite body.

4. The rotor of claim 1 wherein the hardened top portion is comprised of material between 2-5 times as hard as the graphite body.

5. The rotor of claim 1 wherein the hardened top portion is cemented to the graphite body.

6. The rotor of claim 1 wherein the hardened top portion comprises silicon carbide.

7. The rotor of claim 1 wherein the at least part of the second portion formed by the hardened top portion is immediately beneath the first portion.

8. The rotor of claim 1 that includes a flow blocking and bearing plate having a circumference and each blade extends no more than 1 ½" beyond the circumference.

9. The rotor of claim 1 that has a top surface having an area, and each rotor blade includes a recess on the side opposite the first portion, each recess for decreasing the area of the top surface so as to create a larger opening through which more molten metal can pass.

10. The rotor of claim 9 wherein the hardened top portion forms at least part of the recess.

11. The rotor of claim 10 wherein the recess extends from the top surface at a position forward of the trailing surface and terminates at the trailing surface.

12. The rotor of claim 1 that includes a body portion having gaps at the corner of each blade and the hardened top portion has sections that are received by and mate with the gaps.

13. The rotor of claim 12 wherein the gaps include openings that each receive a pin positioned in each respective section of the hardened top portion.

14. The rotor of claim 12 wherein the gap and the hardened top portion include mating openings wherein each two mating openings receive a dowel pin.

15. The rotor of claim 1 wherein the first portion has an angled bottom with an angle of between 30° and 60°.

16. A molten metal pump including the rotor of claim 1.

17. The molten metal pump of claim 16 that includes a superstructure on which a motor is supported, a pump base including a pump chamber in which the rotor is received, and a plurality of support posts connecting the superstructure to the pump base.

18. The rotor of claim 1 that further includes a flow blocking and bearing plate having a circumference and the first portion of each blade extends past the circumference.

19. The rotor of claim 18, wherein the first portion of each blade has a leading edge, and each blade includes a recess and a connecting portion that connects the leading edge and the recess.

20. The rotor of claim 1, wherein the first portion includes a leading edge and the entire leading edge is part of the hardened top portion.

21. The rotor of claim 1, wherein each blade includes a recess and the entire recess is part of the hardened top portion.

22. The rotor of claim 1, wherein the entire first portion is part of the hardened top portion.

23. The rotor of claim 1, wherein part of the leading surface is part of the hardened top portion.

24. The rotor of claim 1, wherein part of the trailing surface is part of the hardened top portion.

25. A rotor that includes a top surface and a bottom; a plurality of imperforate rotor blades for displacing molten metal, wherein each of the plurality of rotor blades includes a horizontally-oriented first portion with a surface angled at 30 degrees to 60 degrees that is configured to push molten metal downward, and a second portion beneath the first portion that is configured to push molten metal outward, a trailing face, and a recess that reduces the area of the top surface to help permit molten metal to pass therethrough and into pump chamber;
   wherein the plurality of imperforate rotor blades are comprised of graphite; and
   the top surface is comprised of ceramic.

26. The rotor of claim 25 that further includes a flow blocking and bearing plate.

27. The rotor of claim 26 wherein the flow blocking and bearing plate is comprised of ceramic.

28. The rotor of claim 25 wherein there are three imperforate rotor blades.

29. The rotor of claim 25 that includes a body portion and the top surface is cemented to the body portion.

30. The rotor of claim 25 that further includes a threaded connective portion at the top for connecting to a rotor shaft.

31. The rotor of claim 25 wherein the first portion of each rotor blade has a horizontally-extending projection with a top surface and a bottom surface, wherein the bottom surface is angled to move molten metal downward.

32. The rotor of claim 31 wherein the second portion of each rotor blade is vertical.

33. The rotor of claim 31 wherein the bottom surface of each horizontally-extending projection is formed at a 10°-60° downward angle relative a horizontal axis.

34. The rotor of claim 31 wherein the top surface of the first portion of each rotor blade is horizontal.

35. The rotor of claim 31 wherein the horizontally-extending projection has a leading edge that is at least ⅛" thick.

36. The rotor of claim 25 wherein each recess extends at an angle from the top surface downward to the trailing surface.

37. A molten metal pump including the rotor of claim 25.

38. The pump of claim 37 that includes a superstructure on which a motor is supported, a pump base including a pump chamber in which the rotor is received, and a plurality of support posts connecting the superstructure to the pump base.

* * * * *